US012595977B2

(12) United States Patent
Porro

(10) Patent No.: US 12,595,977 B2
(45) Date of Patent: Apr. 7, 2026

(54) BAFFLES FOR HEAT EXCHANGERS

(71) Applicant: Yara International ASA, Oslo (NO)

(72) Inventor: Lino Giovanni Porro, Etterbeek (BE)

(73) Assignee: YARA INTERNATIONAL ASA, Oslo (NO)

( * ) Notice: Subject to any disclaimer, the term of this patent is extended or adjusted under 35 U.S.C. 154(b) by 350 days.

(21) Appl. No.: 18/021,422

(22) PCT Filed: Aug. 20, 2021

(86) PCT No.: PCT/EP2021/073140
§ 371 (c)(1),
(2) Date: Feb. 15, 2023

(87) PCT Pub. No.: WO2022/038262
PCT Pub. Date: Feb. 24, 2022

(65) Prior Publication Data
US 2023/0314095 A1     Oct. 5, 2023

(30) Foreign Application Priority Data

Aug. 21, 2020     (EP) .................................... 20192240

(51) Int. Cl.
B01D 1/06          (2006.01)
F28D 7/16          (2006.01)
(Continued)

(52) U.S. Cl.
CPC .............. F28F 9/0135 (2013.01); B01D 1/06 (2013.01); F28D 7/16 (2013.01); F28F 9/013 (2013.01);
(Continued)

(58) Field of Classification Search
CPC ..... B01D 1/06–12; F28D 3/02; F22B 37/205; F28F 9/013; F28F 9/0135; F28F 9/0136
See application file for complete search history.

(56) References Cited

U.S. PATENT DOCUMENTS 3,916,990 A * 11/1975 Ruhe ..................... F28D 7/1669
                                                        165/158
4,486,270 A * 12/1984 Kaasenbrood ........ C07C 273/04
                                                        202/203
(Continued)

FOREIGN PATENT DOCUMENTS

CN          102047062 A      5/2011
CN          203881201 U     10/2014
(Continued)

OTHER PUBLICATIONS

Extended European Search Report issued in App. No. EP20192240, dated Feb. 8, 2021, 5 pages.
(Continued)

*Primary Examiner* — Jonathan Luke Pilcher
(74) *Attorney, Agent, or Firm* — DILWORTH IP, LLC

(57)          ABSTRACT

A baffle for a shell-and-tube heat exchanger. The baffle including a flat plate with a region having a plurality of annular elements designed for receiving the tubes of the shell-and-tube heat exchanger, arranged in at least two rows, wherein a row is staggered with respect to an adjacent row, wherein the outer diameter of the annular element is less than 130% of the inner diameter of the annular element, and wherein each annular element is joined with all of its adjacent annular elements by a bridging structure in the plane of the plate, oriented along a line connecting the centers of two adjacent annular elements, thereby defining a plurality of openings in the plate. A shell-and-tube heat exchanger, a method for heating a liquid composition, a method for stripping a liquid composition including urea, carbamate, ammonia and water, and a method for producing a solid, particulate, urea-based composition.

14 Claims, 3 Drawing Sheets

(51) Int. Cl.

| | |
|---|---|
| *F28F 9/013* | (2006.01) |
| *F28F 21/08* | (2006.01) |
| *B01D 9/02* | (2006.01) |
| *F28D 3/02* | (2006.01) |
| *F28D 21/00* | (2006.01) |
| *F28F 9/22* | (2006.01) |

(52) U.S. Cl.

CPC .............. *F28F 21/082* (2013.01); *B01D 9/02* (2013.01); *F28D 3/02* (2013.01); *F28D 2021/0022* (2013.01); *F28F 2009/226* (2013.01)

(56) References Cited

U.S. PATENT DOCUMENTS

| | | | | |
|---|---|---|---|---|
| 7,635,456 | B2 * | 12/2009 | Burlingame | ............. B01J 8/065 422/204 |
| 9,885,523 | B2 * | 2/2018 | Zimmer | ................ F28F 9/0133 |
| 11,331,593 | B2 * | 5/2022 | Gevers | .............. B01D 19/0015 |
| 2014/0262162 | A1 | 9/2014 | Zimmer | |
| 2017/0211887 | A1 | 7/2017 | Landry et al. | |
| 2022/0040591 | A1 * | 2/2022 | Gevers | .................. B01D 1/065 |

FOREIGN PATENT DOCUMENTS

| | | | |
|---|---|---|---|
| CN | 105971695 | A | 9/2016 |
| CN | 108917428 | A | 11/2018 |
| CN | 110285692 | A | 9/2019 |
| EP | 3569305 | A1 | 11/2019 |
| EP | 3689433 | A1 | 8/2020 |
| GB | 196583 | A | 8/1923 |
| RU | 2145698 | C1 | 2/2000 |

OTHER PUBLICATIONS

International Search Report and Written Opinion issued in App. No. PCT/EP2021/073140, mailing date Nov. 4, 2021, 12 pages.

Office Action and Search Report received for Chinese Application No. 2021800559038, mailed on Nov. 26, 2025, 12 pages (5 pages of original office action and 7 pages of English Translation).

Zhongqing et al., "Efficiency Longitudinal Flow Baffle Plate Heat Exchanger", Energy Conservation and Emission Reduction in Petroleum and Petrochemical Industries, No. 3, Jun. 20, 2012, pp. 1-8.

* cited by examiner

BAFFLES FOR HEAT EXCHANGERS

FIELD

The present disclosure is related to the field of heat exchangers. In particular, the present disclosure discloses a novel design of baffles for shell-and-tube heat exchangers.

BACKGROUND

Heat exchangers are widely used in chemical plants. These apparatus are used to transfer heat between a product which may be a liquid, solid, a liquid/vapor phase or slurry composition and a fluid. The fluid may be a cooling or heating one. A common heating fluid used therein is steam, as steam is often available in a chemical plant and may be used to heat up a composition.

There are several designs for heat exchangers, one of them is called a shell-and-tube heat exchanger: this type comprises a body comprising a plurality of tubes, in particular straight tubes, in particular straight tubes with identical outer or external diameters, enclosed in a shell. The composition to be heated or cooled is distributed inside these tubes and a cooling or heating fluid is directed in the shell of the heat exchangers and cools down or heats up the tubes. The plurality of tubes must be maintained within the shell to ensure a continuous operation and limit their vibrations. Two main support systems may be used: a network of metal rods disposed in multiple directions within the shell or a series of baffle plates comprising a plurality of holes corresponding to the plurality of tubes.

When a heating fluid, such as steam is used, it is important to distribute the steam evenly throughout the shell of the heat exchanger to ensure an homogeneous heating of the tubes. Moreover it is important to remove the steam condensate, i.e. water, formed by the condensation of the steam on the tubes, to avoid accumulation. An uneven distribution may lead to issues such as non-uniform heat release on the tubes side, leading to lack of performance of the heat exchanger or a non-uniform temperature on the tubes side, with some tubes being more heated than others, and possible corrosion when the composition to be heated is corrosive. It is well known that corrosion is enhanced by an increased temperature.

CN203881201U discloses baffles for a heat exchanger wherein the baffles comprise two series of holes, a first series of circular holes corresponding to the tubes of the heat exchanger, and a second series of rectangular holes, which reduce the pressure drop across the shell and improve overall heat transfer performance.

SUMMARY

It was found out that it was possible to improve the heating profiles of the plurality of tubes within a shell-and-tube heat exchanger, especially the distribution of steam condensate within the shell of the heat exchanger by providing a novel type of baffles.

In one aspect, the present disclosure provides a baffle for a shell-and-tube heat exchanger. The baffle comprises a planar assembly of a plurality of annular structures (herein also referred to as hollow cylinders), which are interconnected with bridging structures, wherein said annular structures are designed for receiving the plurality of tubes of the shell-and-tube heat exchanger; wherein the outer diameter of an annular structure is less than 130% of the inner diameter of the annular structure; wherein said annular structures are positioned in at least two rows, wherein a row is staggered with respect to its adjacent row(s); wherein each annular structure is connected with all its adjacent annular structures by a bridging structure oriented along a line between the centers of two adjacent annular structures, thereby forming a plurality of openings in the baffle, with the annular structures positioned on the corners of the openings. The present baffle thus comprises a plurality of circular openings, i.e. within the annular elements, and a plurality of openings defined by three bridging structures and three, staggered annular elements. In particular embodiments, the baffle is made of metal, more particularly made of steel or stainless steel.

In another aspect, the present disclosure provides a shell-and-tube heat exchanger comprising: a top end in fluid connection with a bottom end through a plurality of straight tubes, also referred to as "a plurality of tubes", with each tube or straight tube having the same external diameter, i.e. having an identical outside diameter, disposed within a shell; the top end comprising an inlet for a liquid and, optionally an outlet for a gas; the bottom end comprising an outlet for a liquid and, optionally an inlet for a gas; a heating fluid inlet and a heating fluid outlet in fluid connection with a shell-side space, in which the plurality of straight tubes is disposed; the shell-and-tube heat exchanger having a longitudinal direction and lateral cross sections, the longitudinal direction being parallel to the tubes and the lateral cross sections being perpendicular to the longitudinal direction; a plurality of baffles according to the present disclosure arranged in the shell-side space, wherein the baffles are positioned substantially parallel with the lateral cross sections; wherein the tubes are received within the circular opening of the annular elements of the baffles; and wherein the inner diameter of annular elements in the baffles is equal to or greater than the external diameter of the straight tubes, i.e. wherein the inner diameter of each annular element is equal to or greater than the external diameter of each straight tube of the plurality of straight tubes.

In another aspect, the present disclosure provides a method for heating a fluid composition comprising the steps of: providing a shell-and-tube heat exchanger according to the present disclosure; providing a liquid composition to the inlet; providing a heating fluid, in particular steam, to the shell-side space by means of the heating fluid inlet; heating the plurality of straight tubes by means of the heating fluid; extracting a heated liquid composition at the outlet.

In another aspect, the present disclosure provides a method for stripping a liquid composition comprising urea, carbamate, ammonia and water comprising the steps of: providing a shell-and tube heat exchanger according to the present disclosure; providing a liquid composition comprising urea, carbamate, ammonia and water to the inlet; providing steam, in particular saturated steam at a temperature between 195 and 225° C., to the shell-side space by means of the heating fluid inlet; providing a stripping gas comprising carbon dioxide to the inlet; contacting the liquid composition and the stripping gas, in a tube-side space disposed within the plurality of straight tubes; heating the plurality of straight tubes by means of the steam; extracting a liquid composition comprising urea and water and a reduced amount of carbamate and ammonia and water, at the outlet; extracting a gas mixture comprising ammonia, carbon dioxide and water at the outlet; extracting steam and steam condensate at the heating fluid outlet.

In another aspect, the present disclosure provides a method for producing urea comprising the step of directing a liquid composition comprising urea, carbamate, ammonia and water in a shell-and-tube heat exchanger according to the present disclosure.

BRIEF DESCRIPTION OF THE FIGURES

The following description of the figures representing a specific embodiment of a system according to the present disclosure is only given by way of example and is not intended to limit the present explanation, its application or use. In the figure, identical reference numerals refer to the same or similar parts and features.

DETAILED DESCRIPTION

Figure 1:
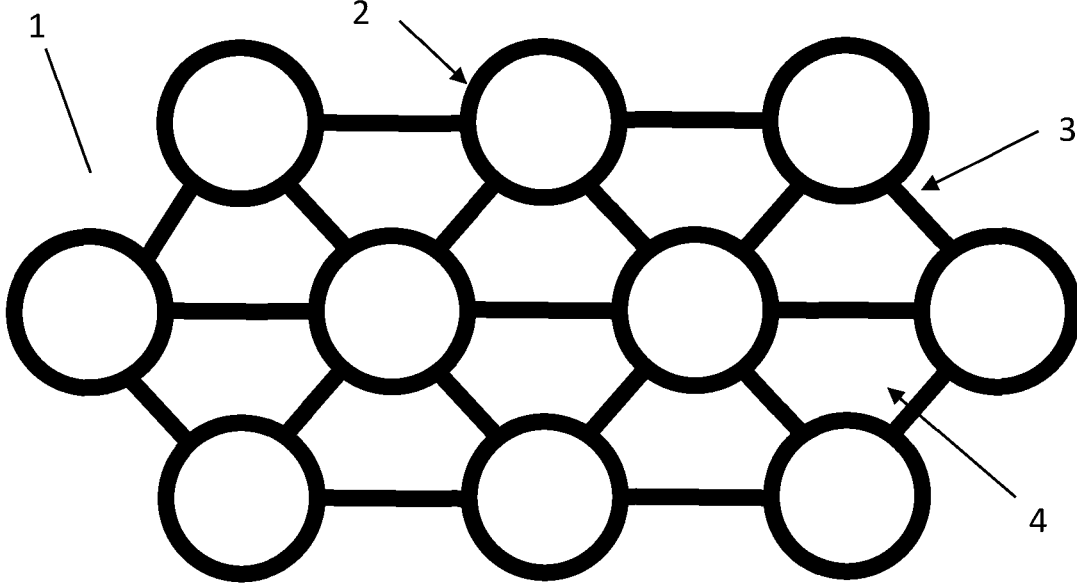
FIG. 1 represent a section of an embodiment of a baffle according to the present disclosure.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, in particular +/−10% or less, more in particular +/−5% or less, even more in particular +1-1% or less, and still more in particular +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The term "tube", particularly in the phrase "plurality of tubes", as it pertains to a heat exchanger as disclosed herein, is generally used interchangeably with the term "straight tube", particularly in the term "plurality of straight tubes".

In one aspect, the present disclosure provides a baffle for a shell-and-tube heat exchanger. The baffle comprises a planar assembly of a plurality of annular structures (herein also referred to as hollow cylinders), which are interconnected with bridging structures, wherein said annular structures are designed for receiving the plurality of tubes of the shell-and-tube heat exchanger; wherein the outer diameter of the annular structure is less than 130% of the inner diameter of the annular structure; wherein said annular structures are positioned in at least two rows, wherein a row is staggered with respect to its adjacent row(s); wherein each annular structure is connected with all its adjacent annular structures by a bridging structure oriented along a line between the centers of two adjacent annular structures, thereby forming a plurality of openings in the baffle, with the annular structures positioned on the corners of the openings.

A baffle in a shell-and-tube heat exchanger is a device that may fulfil different purposes: first, to maintain the plurality of straight tubes of the heat exchanger in their position and limit their vibrations; and secondly, to increase the heat coefficient transfer shell side by enhancing the fluid velocity on the shell side.

Baffles are placed in the shell-side space that is defined by the shell of the heat exchanger. Since the individual tubes of the plurality of straight tubes in a shell-and-tube heat exchanger typically have a circular cross-section, a baffle needs to comprise circular openings (herein also referred to as cylindrical through holes) to accommodate these tubes. Tubes in a shell-and-tube heat exchanger often have a cylindrical cross section, thus it may be preferable that the baffle comprises circular openings or annular elements.

These circular openings or annular elements are distributed in at least a region of the baffle, in at least two rows where the two rows are in a staggered pattern.

Within the shell-side space, it is critical that the heating fluid, that may be a heating fluid comprising or consisting of steam, is able to be distributed throughout the whole shell-side space to ensure an even heating of all the tubes on the entire length of the heat exchanger. To achieve that, a variety of options are possible when designing a heat exchanger and its baffles: for example, the baffles may be segmented, meaning that they do not cover an entire cross-section of the shell; alternatively, the baffles may comprise circular openings with a diameter greater than the diameter of the tubes of the heat exchanger; or the baffles may comprise another series of holes in addition to the cylindrical through-holes designed for receiving the tubes of the heat exchanger.

A problem was recently identified by the inventors of the present disclosure. When the liquid solution to be heated contains a corrosive material, for example ammonium carbamate (which will be referred to as carbamate for the remaining of this document), it was observed that some tubes in a carbon dioxide stripper presented an abnormal level of corrosion after only a few years of operations.

A stripper is a heat exchanger where the liquid injected in the heat exchanger is stripped of some of its components during its stay in the heat exchanger. In urea production, a stripper is used to concentrate and purify an aqueous solution comprising urea, carbamate, ammonia and water. The solution coming out of a urea reactor always contains a mixture of urea, carbamate, ammonia and water since the transformation of carbamate into urea is not quantitative, and ammonia is added in excess in the reactor. Decomposition of the carbamate from the aqueous solution back to carbon dioxide and ammonia and removing the ammonia from the aqueous solution may be done by simply heating the solution in a heat exchanger, but it may be improved by the addition of a stripping gas in the heat exchanger, comprising ammonia and/or carbon dioxide, at the bottom of the heat exchanger or stripper.

Carbamate is a known corrosive compound, especially to steel, and although new materials are developed to limit this deterioration, it is highly desirable to limit the corrosion by other means. Without being bound by theory, it is thought that an accumulation of condensate between tubes of the stripper on standard baffles, may cause a decrease of heat transfer between the tubes and the steam present in the shell-side space, caused by condensate accumulation. The falling speed of the condensate is very low and tends to accumulate on the baffles. Accumulation of steam condensate on baffles may vary depending on several factors, such as the geometry of the baffles (for example in the disc and doughnut configuration) and the size of the stripper (bigger strippers require larger baffles where more condensate may accumulate). If some areas are facing an higher accumulation of steam condensate than other areas, the heat coefficient transfer will be lower in the tubes of these areas. To compensate the lack of performances of such tubes, the other tubes, less affected by steam condensate accumulation, will have to exchange more heat and that can be done only by increasing the steam temperature. As a result the skin temperature on the process side of these tubes will be higher than the others, leading to a higher corrosion rate. For example, in a large $CO_2$ high-pressure stripper equipped with disc and doughnut baffles it has been found that corrosion rate is higher in the outer tubes than in the inner tubes (due to an increased accumulation of steam condensate on the inner tubes compared to the outer tubes in the stripper. Within the context of this disclosure, a stripper comprising more than 2000 tubes in its shell may be considered a large stripper. A stripper comprising less than 2000 tubes may be considered a small stripper.

Such an accumulation may be prevented by the use of rod baffles instead of plate baffles. Indeed rods would let the steam condensate flow freely towards the bottom of the stripper and keep the temperature profile of the tubes within the desired range. However, the geometry of the whole stripper has to be modified in order to accommodate rod baffles, often leading to a bigger shell, making the apparatus more expensive to produce.

It was found that it was possible to design a new type of baffle where the accumulation of steam condensate would be minimal. As mentioned above, a baffle must comprise circular openings or holes to receive the plurality of tubes of the heat exchanger. It was found that the reduction in condensate accumulation was achieved by designing a baffle where the circular openings are obtained and defined by an annular element wherein the outer diameter of the annular element is less than 130% of the inner diameter of the annular element, and wherein each annular element is joined with all of its adjacent annular element by a bridging structure in the plane of the baffle, oriented along a line connecting the centers of two adjacent annular elements, thereby defining a plurality of openings in the baffle, with the annular elements positioned at the corners of the opening. The annular elements ensure that the baffle can maintain the tubes in place during operations and limit the condensate that can accumulate at each baffle before it falls towards the next baffle. In particular, the inner diameter of an annular element of the baffle is equal to or greater than the external diameter of a straight tube of the plurality of straight tubes of the heat exchanger. To provide structural strength to the baffles, adjacent annular elements are connected to one another by a bridging structure. It was found that a bridging structure that is oriented along a line connecting the centers of two adjacent annular elements was suitable to limit the condensate accumulation and provide enough strength to the baffle so that it would perform as it should during operations.

The staggered rows of annular elements or hollow cylinders, and the bridging structures connecting adjacent annular elements within each row and within adjacent staggered rows define a plurality of openings in the baffle in addition to the circular openings defined by the annular elements. The difference between the outer and inner diameter of the hollow cylinders directly influences the amount of water that can accumulate on a baffle. The greater the outer diameter is compared to the inner diameter, the more water can accumulate. However, if the difference is too small, the baffle might be too weak to hold the tubes in place during operations. The minimum difference between the outer and inner diameter will be influenced by various factors, such as the inner diameter of the annular element and the material used for the baffle. It was found that the outer diameter of an annular element could be at most equal to 130% of the inner diameter and still provide a baffle with suitable performance.

In one embodiment, the outer diameter of an annular element is less than 125% of its inner diameter. In one embodiment, the outer diameter of an annular element is less than 120% of its inner diameter.

In one embodiment, the outer diameter of an annular element is less than 115% of its inner diameter. In some cases, it was found that the outer diameter of an annular element could be at most equal to 115% of the inner diameter. This would allow less condensate to accumulate and still provide sufficient strength to the baffle.

In one embodiment, the outer diameter of an annular element is at least 101, 102, 103, 104, 105% of its inner diameter. The minimum thickness of the walls of an annular element may depend on the actual value of its inner diameter. For example, if the inner diameter is 20 mm, the outer dimeter may have to be at least 21.0 or 22.0 mm, i.e. 105 or 110% of the inner diameter. But if the inner diameter is 50 mm, it may be enough for the outer diameter to be at least 52 mm, i.e. 104% of the inner diameter.

In one embodiment, the outer diameter of an annular element is 2.0 to 4.0 mm greater than the inner diameter of the annular element. For a baffle comprising annular elements with an inner dimeter of 20 to 40 mm, it was found that the outer diameter could be 2.0 to 4.0 mm greater than the inner diameter.

In one embodiment, the width of the bridging structure between two adjacent annular elements is at least 2.0 mm, in particular between 2.5 and 6.0 mm, more in particular between 2.5 and 5.0 mm, even more in particular between 2.5 and 4.0 mm. In one embodiment, the width of the bridging structure between two adjacent annular elements may be 3.0 mm. The bridging structure connects all the annular elements with one another and brings structural strength to the baffle so it can withstand the vibrations and temperatures of the tubes during operations. But the wider the structure is, the more water can accumulate on the baffles, so a compromise has to be made between these two aspects. In some examples, it was found that a bridging structure between two adjacent annular elements of at least 3.0 mm was satisfying.

In one embodiment, the height, or thickness, of the baffle is between 4.0 and 10.0 mm, in particular between 4.5 and 7.0 mm, in particular 5.0 mm. The strength of baffle increases with its height. However, production costs increases with the height as well. In many fields, a plate height between 4.0 and 10.0 mm, in particular 5.0 mm, is considered standard.

In one embodiment, the baffle comprises between 1000 to 8000 circular holes The number of holes in a baffle depends on several factors such as the size of the heat exchanger, the flow and temperature of the fluid to be heated or cooled, and the envisioned production rate. Typically, for an industrial urea plant, a baffle may comprise between 1000 to 8000 circular holes.

In one embodiment, the baffle comprises an outer ring enclosing the annular elements and the outer ring has an outer diameter 1 to 10 mm smaller than the diameter of the shell of the heat exchanger. The outer ring may provide additional structural strength to the baffle and facilitates its installation in the heat exchanger.

In another aspect, the present disclosure provides a shell-and-tube heat exchanger comprising: a top end in fluid connection with a bottom end through a plurality of straight tubes with each straight tube having identical outside or external diameter, disposed within a shell; the top end comprising an inlet for a liquid and, optionally an outlet for a gas; the bottom end comprising an outlet for a liquid and, optionally an inlet for a gas; a heating fluid inlet and a heating fluid outlet in fluid connection with a shell-side space, in which the plurality of straight tubes is disposed; the shell-and-tube heat exchanger having a longitudinal direction and lateral cross sections, the longitudinal direction being parallel to the tubes and the lateral cross sections being perpendicular to the longitudinal direction; a plurality of baffles according to the present disclosure arranged in the shell-side space, wherein the baffles are substantially parallel with the lateral cross sections; wherein the tubes are received within the circular openings of the baffles; and wherein the diameter of the circular openings (i.e. the inner diameter of the annular elements) in the baffles is equal to or greater than the external diameter of the straight tubes.

The baffles are substantially parallel with the lateral cross sections as this configuration simplifies the production of the baffles and their installation. It may also be possible to have baffle plates installed such that the angle between the baffles and a lateral cross-sections is not equal to 0°, in particular where the angle between the baffles and a lateral cross-sections is less than 20°. Such a configuration may have other benefits than parallel baffles, for example the flow of the heating fluid within the shell-side space may be improved. In this case the baffles must be carefully designed so that the circular holes correspond to the tubes of the heat exchanger.

A baffle wherein the inner diameter of an annular element in the baffles is equal to the external diameter of the straight tubes of the plurality of tubes would provide excellent stabilization of the tubes since these would have no space to vibrate. However, it may be an advantage to have the inner diameter of the annular elements be greater than the external diameter of the straight tubes to facilitate the installation of the baffles. In one embodiment, the inner diameter of each annular element is 0.5 to 4.0 mm, in particular 0.5 to 3.0 mm, greater than the external diameter of each of the straight tubes of the plurality of straight tubes.

In one embodiment, the heat exchanger comprises multisegmented baffles. A heat exchanger may comprise baffles that only have holes for a fraction of the total number of straight tubes comprised in the heat exchanger, in particular each baffle may have a number of holes equal to 50% or less of the total number of straight tubes contained in the heat exchanger. In one embodiment, baffles may have a number of holes equal to 50% or less of the total number of straight tubes contained in the heat exchanger. In one embodiment, baffles may have a number of holes equal to 33% or less of the total number of straight tubes contained in the heat exchanger. In one embodiment, baffles may have a number of holes equal to 25% or less of the total number of straight tubes contained in the heat exchanger. Such baffles have a smaller area than single baffles and thus allows less condensate to accumulate on their surface. All the tubes of the plurality of tubes contained in the heat exchanger must be supported by at least one baffle. For example, if each baffle comprise enough holes to accommodate 25% of the tubes of the plurality of tubes contained in a heat exchanger, at least four baffles will be required in the heat exchanger. Multi-segmented baffles may have various designs: for example, the baffles may be circular sectors of a cross section of the heat exchanger, in particular they may be quadrants, i.e. a circular sector with a 90° angle.

In one embodiment, the baffles are disk-and-doughnut baffles comprising disk baffles and doughnut baffles, each disk baffle being shaped as a disk, and each doughnut baffle being shaped as an annulus, the diameter of the disk baffles being equal to or greater than the inner diameter of the doughnut baffles within a margin of less than 10%, the disk baffles and the doughnut baffles being consecutively and alternatingly positioned along the longitudinal direction of the shell-and-tube heat exchanger. Using disk and doughnut baffles ensures that all tubes are supported by several baffles while ensuring that each baffle is not too big. Baffles with a diameter smaller than the diameter of the shell of the heat exchanger allows the steam and the condensate to flow better within the shell. In one embodiment, the shell-and-tube heat exchanger comprises 6 to 12 baffles. For a heat exchanger in an industrial plant, for example, a carbon dioxide-driven urea stripper, it was found that 8 to 10 baffles was satisfying. The number of baffles may be dictated by the intensity of the vibrations of the tubes. The more the tubes vibrate, the more baffles are required. The number of baffles may also be influenced by the length of the tubes, as longer tubes require more baffles. However, an increasing number of baffles also increases the pressure drop in the stripper. It may be recommended to limit the pressure drop below a certain value depending on the parameters of the plant.

In one embodiment, the shell-and-tube heat exchanger comprises a first baffle placed directly on top of a second baffle. In order to increase the strength of a baffle, it is possible to increase its thickness. But, it may be too difficult or too expensive to produce baffles with a non-standard thickness. Instead of incurring high costs for their purchase, it may be possible to place a baffle directly on top of another baffle. The two baffle stacked together will have properties resembling a baffle twice their thickness.

In one embodiment, the diameter of the circular openings or holes, or stated differently, the inner diameter of the annular elements in the baffles is 1.0 to 4.0 mm greater than the external diameter of the straight tubes of the heat exchanger. It may be preferable that the inner diameter of the annular elements in the baffles is greater than the external diameter of the straight tubes, so that the installation is facilitated. However, if a gap between the tube and the baffle is too large, the baffle will not decrease the vibrations well enough. It was found that a gap between 0.5 and 2.0 mm between a tube and an annular element, that is a difference of 1.0 to 4.0 mm in diameter, was suitable. The gap also allows steam condensate to evacuate the baffle.

In another aspect, the present disclosure provides a method for heating a liquid composition comprising the steps of: providing a shell-and-tube heat exchanger according to the present disclosure comprising a top end fluidly connected to a bottom end through a plurality of straight tubes enclosed in a shell thereby defining a shell-side space, an inlet for a liquid comprised in the top end, an inlet for a heating fluid fluidly comprised in the shell and connected to the shell-side space, an outlet for a liquid comprised in the bottom end and a heating fluid comprised in the shell; providing a liquid composition to the inlet; providing a heating fluid, in particular steam, to the shell-side space by means of the heating fluid inlet; heating the plurality of straight tubes by means of the heating fluid; extracting a heated liquid composition at the outlet; and extracting the heating fluid at the heating fluid outlet.

The shell-and-tube heat exchanger as described above may be used to heat up any liquid composition. The liquid composition is directed with means, for example a pipe, to the inlet comprised in the top end of the heat exchanger. When the liquid enters the top end, it is distributed as equally as possible to the plurality of straight tubes of the heat exchanger and forms a film on the inside wall of the tubes.

Devices or features may be added to the top end of the heat exchanger to improve the distribution of the liquid composition in the tubes. Such devices or features are well known in the field.

The heating fluid, that may comprise steam or consist of steam, is directed to the shell-side space via the heating fluid inlet. The heating fluid will fill up the shell-side space and heat up the plurality of straight tubes. The tubes are produced in a conducting material, for example a metal, in particular a metal comprising steel, such as stainless steel. The material selected for the tubes may depend on several factors of the operations of the heat exchanger such as the nature of the heating fluid, the temperature of the heating fluid, and the liquid composition to be heated up.

The heating fluid contacts the plurality of straight tubes and heats them up, and the tubes transfer the heat to the liquid composition, which forms a film on the inside wall of the tube. The liquid composition falls by gravity towards the bottom end of the heat exchanger where the liquid composition may be extracted.

The heating fluid is extracted from the shell-side space via the heating fluid outlet.

The baffles according to the present disclosure ensures that steam condensate accumulates as little as possible on the baffles and that the temperature profile of the plurality of tubes is as constant as possible throughout a cross-section of the heat exchanger and across its longitudinal direction, and that the maximum temperature reached within the tubes is lower than in a heat exchanger comprising baffles with other designs for the same heat exchanger performances.

In another aspect, the present disclosure provides a method for stripping a liquid composition comprising urea, carbamate, ammonia and water comprising the steps of: providing a shell-and tube heat exchanger according to the present disclosure comprising a top end fluidly connected to a bottom end through a plurality of straight tubes enclosed in a shell thereby defining a shell-side space, an inlet for a liquid comprised in the top end, an outlet for a gas comprised in the top end, an inlet for a heating fluid fluidly comprised in the shell and connected to the shell-side space, an inlet for a stripping gas comprised in the bottom end, an outlet for a liquid comprised in the bottom end and a heating fluid outlet comprised in the shell; providing a liquid composition comprising urea, carbamate, ammonia and water to the inlet; providing steam, in particular saturated steam between 195 and 225° C., to the shell-side space by means of the heating fluid inlet; providing a stripping gas comprising carbon dioxide to the inlet; contacting the liquid composition and the stripping gas, in a tube-side space disposed within the plurality of straight tubes; heating the plurality of straight tubes by means of the steam; extracting a liquid composition comprising urea and water, and a reduced amount of carbamate and ammonia, at the outlet; extracting a gas mixture comprising ammonia, carbon dioxide and water at the outlet; extracting steam and steam condensate at the heating fluid outlet.

The baffles according to the present disclosure may also be used in a urea stripper to decompose carbamate from a liquid composition comprising urea, carbamate, ammonia and water. Adding a stripping gas, such as carbon dioxide to a urea stripper improves the efficiency of the stripper by lowering the partial pressure of ammonia in the aqueous solution and accelerating its vaporization. A liquid composition to be stripped of carbamate often comprises ammonia as well, since ammonia is used in excess in a urea reactor, so it is important to improve the elimination of ammonia from the liquid composition.

Using a urea stripper comprising the baffles according to the present disclosure may lower the maximum temperature reached within the plurality of tubes compared to a heat exchanger comprising baffles with other designs. It is well known that the rate of corrosion is dependent on the temperature of the carbamate solution, so a reduced temperature leads to less corrosion rate.

The stripper may only achieve a 80 to 99%, in particular 80, 85, 90 or 95%, reduction in the amount of carbamate and/or ammonia present in the liquid composition. The reduction in carbamate and ammonia may depend on many factors specific to each operation.

The gas mixture comprising ammonia, carbon dioxide and water collected at the outlet may be re-used in the production process to increase the conversion rate of the starting materials, ammonia and carbon dioxide. In particular, the gas mixture may be re-injected in a urea reactor after being partially condensed, for example in a high pressure carbamate condenser, producing low pressure steam, for example from 2 to 8 bar, from the heat released by ammonia and carbon dioxide condensing in carbamate.

In another aspect, the present disclosure provides a method for producing urea comprising the steps o: a) reacting a mixture of ammonia and carbon dioxide in a urea reactor, thereby producing an aqueous composition comprising urea, carbamate and ammonia; b) directing the aqueous composition comprising urea, carbamate and ammonia obtained in step a) in a shell-and-tube heat exchanger according to the present disclosure comprising an inlet for a heating fluid, an inlet for a gas and an outlet for a gas; c) directing a stream of saturated steam at a temperature between 195 and 215° C. to the inlet of the shell-and-tube heat exchanger; d) directing a stripping gas comprising carbon dioxide to the inlet; e) extracting a liquid composition comprising urea and a reduced amount of ammonia and carbamate from the shell-and-tube heat exchanger; f) concentrating the liquid composition comprising urea and a reduced amount of ammonia and carbamate obtained in step e), thereby obtaining a concentrated urea aqueous solution; g) transforming the concentrated urea aqueous solution obtained in step f) into a solid, particulate, urea-based composition.

The industrial production of urea may be done according to different technologies and processes, however, they all start with mixing carbon dioxide and ammonia in a reactor under high pressure and temperature. The resulting composition is an aqueous solution comprising urea, carbamate ammonia and water. This aqueous solution needs to be purified and concentrated by removing the ammonia and carbamate. This is often done in a shell-and-tube heat exchanger called urea stripper. Producing urea in a process comprising a stripper comprising baffles according to the present disclosure ensures that the stripper has an extended lifetime compared to standard strippers due to a lower corrosion rate in its tubes. This reduces the cost of operations of the plant and reduces the final cost of the urea produced in the process. The aqueous solution obtained from the stripper has a much reduced content in carbamate and ammonia compared to the solution obtained from the urea reactor. The aqueous urea solution is then concentrated to obtained a concentrated urea solution or melt via means known in the art, and the concentrated urea solution may be transformed in a solid, particulate, urea-based composition in a particulation unit. Several apparatus are known to produce solid, particulate, urea-based compositions from a concentrated urea solution: for example, a prilling tower, a granulator such as a fluidized bed granulator, a spherodizer, and a pastillator.

It is well known in the field of urea production that a solid, particulate urea-based composition may comprise additional additives or elements with an agronomical benefits. For example the composition may contain one or more source of one or more of the elements selected from the group of nitrogen, phosphorus, potassium, magnesium, calcium, sulphur, iron, boron, manganese, molybdenum, zinc and copper.

FIG. 1 represent a 2D-drawing of section of a baffle according to the present disclosure viewed from above. The baffle 1 comprises a plurality of hollow cylinders, here viewed as annular elements or annuli 2, defining a plurality of circular openings or holes. The annular elements are distributed on multiple staggered rows. Each cylinder, or annulus/annular element, is connected to all its adjacent cylinders by a bridging structure or segment 3. Each segment is oriented along a line connecting the centers of the two adjacent annular elements that it connects. The annuli 2 and segments 3 define a plurality of six-sided openings, wherein each such opening consists of three straight walls defined by a segment 3 and three curved walls defined by a portion of an annular element 2. Stated differently, the annuli 2 and segments 3 define a plurality of openings, wherein the segments 3 define a triangle, with the annuli 2 positioned on or superimposed on the corners thereof. The openings 4 can thus be defined as triangular-like structures, defined by the bridging structures 3, wherein the corners of the triangles are replaced with an inward-pointing curve, defined by the annular element 2. In FIG. 1, the outer diameter of a hollow cylinder is equal to 120% of the inner diameter.

Figure 2:
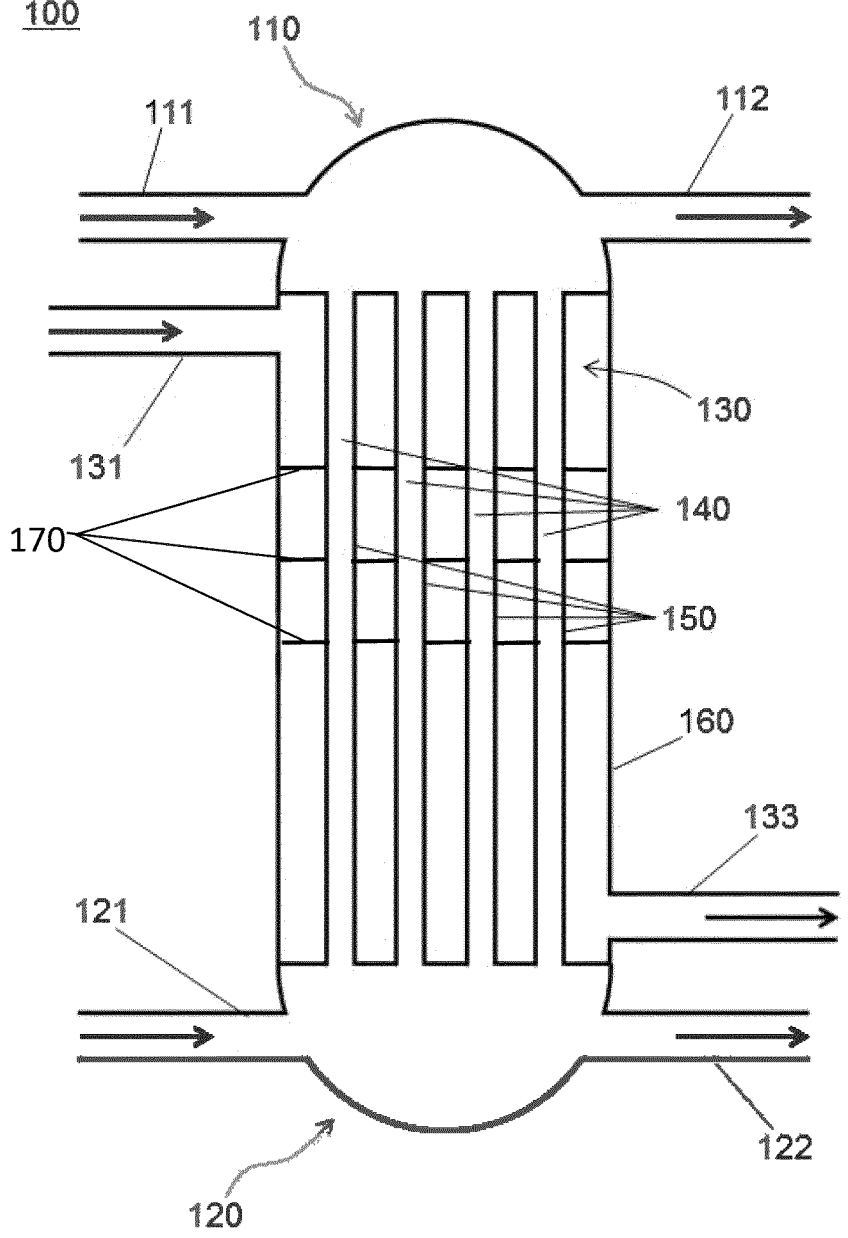
FIG. 2 represents an embodiment of a shell-and-tube heat exchanger according to the present disclosure.

FIG. 2 represents a shell-and-tube heat exchanger or stripper according to the present disclosure. The stripper 100 is a carbon dioxide stripper and comprises a shell 160 and a plurality of tubes 150 which are disposed within the shell 160. Also, the stripper 100 comprises a top end 110 and a bottom end 120. The plurality of tubes 150 is disposed between the top end 110 and the bottom end 120. A tube-side space 140 is disposed within each of the tubes 150. A shell-side space 130 is disposed between the tubes 150 and the shell 160. The shell-side space 130 is separated from the top end 110 and the bottom end 120. The top end 110 and the bottom end 120 are in fluid connection with the tube-side space 140. The bottom end 120 comprises an outlet 122 for a liquid composition concentrated in urea and an inlet 121 for a stripping gas, in particular carbon dioxide. The top end 110 comprises an inlet 111 for a liquid composition comprising urea and carbamate and an outlet 112 for a gas mixture that comprises the stripping gas and one or more stripped compounds. The stripper 100 further comprises a heating fluid inlet 131 and a heating fluid outlet 133. The heating fluid inlet 131 and the heating fluid outlet 133 are in fluid connection with the shell-side space 130. Also, the heating fluid inlet 131 is adjacent to the top end 110 of the stripper 100. The heating fluid outlet 133 is adjacent to the bottom end 120 of the stripper 100. Each of the plurality of tubes 150 has a length of 6.0 m and an outer diameter of 31.0 mm. The stripper has a cylindrical shell with a diameter of 3.1 m. The stripper comprises a plurality of baffles 170 according to the present disclosure. Each baffle comprises a circular opening or hole for each tube 150 comprised in the stripper.

Figure 3:
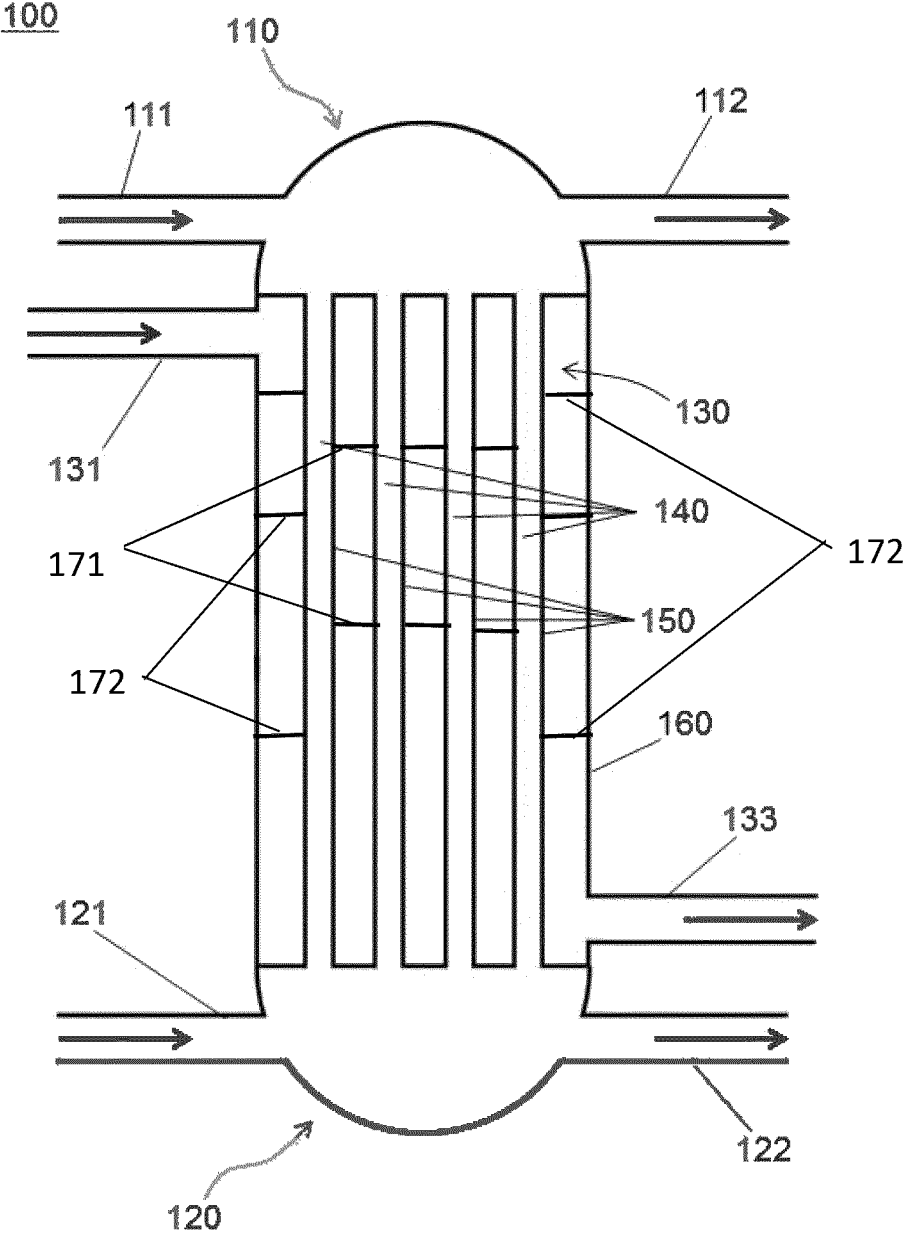
FIG. 3 represents another embodiment of a shell-and-tube heat exchanger according to the present disclosure.

Alternatively, the stripper may comprise a plurality of disk baffles 171 and doughnut baffles 172 as shown in FIG. 3. The diameter of a disk baffle 171 may be about 75% of the diameter of the shell 160. The inner dimeter of a doughnut baffle 172 may be about 70% of the diameter of the shell 160, while the outer diameter of the doughnut baffle 172 may be 95 to 99% of the diameter of the shell 160.

The invention claimed is:

1. A shell-and-tube heat exchanger comprising:

a top end in fluid connection with a bottom end through a plurality of straight tubes with identical outside diameter, disposed within a shell;

the top end comprising an inlet for a liquid and an outlet for a gas;

the bottom end comprising an outlet for a liquid and an inlet for a gas;

a heating fluid inlet and a heating fluid outlet in fluid connection with a shell-side space, in which the plurality of straight tubes is disposed;

the shell-and-tube heat exchanger having a longitudinal direction and lateral cross sections, the longitudinal direction being parallel to the plurality of straight tubes and the lateral cross sections being perpendicular to the longitudinal direction;

a plurality of baffles arranged in the shell-side space, wherein the baffles are substantially parallel with the lateral cross sections, each of the plurality of baffles comprising a planar assembly of a plurality of annular structures interconnected with bridging structures, said baffle made of metal, wherein said annular structures are designed for receiving a plurality of straight tubes of the shell-and-tube heat exchanger, wherein an outer diameter of an annular structure is less than 130% of an inner diameter of the annular structure, wherein said annular structures are positioned in at least two rows, wherein a row is staggered with respect to its adjacent row(s), wherein each annular structure is connected with all its adjacent annular structures by a bridging structure oriented along a line between centers of two adjacent annular structures, thereby forming a plurality of openings, with the annular structures positioned on corners of the opening;

wherein each straight tube of the plurality of straight tubes is received within an annular structure of the baffles; and wherein the inner diameter of the annular structures of the baffles is equal to or greater than an external diameter of the plurality of straight tubes, wherein the plurality of baffles include disk baffles and doughnut baffles, each disk baffle being shaped as a disk, and each doughnut baffle being shaped as an annulus, the diameter of the disk baffles being equal to or greater than the inner diameter of the doughnut baffles, the disk baffles and the doughnut baffles being consecutively and alternatingly positioned along the longitudinal direction of the shell-and-tube heat exchanger, wherein the plurality of baffles comprises a first baffle stacked directly on top of a second baffle.

2. The shell-and-tube heat exchanger according to claim 1, wherein the outer diameter of the annular structures in the baffles is less than 115% of the inner diameter of the annular structures.

3. The shell-and-tube heat exchanger according to claim 1, wherein the outer diameter of the annular structures in the baffles is 2.0 to 4.0 mm greater than the inner diameter of the annular structures.

4. The shell-and-tube heat exchanger according to claim 1, wherein each of the baffles comprises between 1000 to 8000 annular structures.

5. The shell-and-tube heat exchanger according to claim 1, wherein the inner diameter of the annular structures in the baffles is 0.5 to 4.0 mm greater than the external diameter of the straight tubes.

6. The shell-and-tube heat exchanger according to claim 1, wherein the shell and tube heat exchanger plurality of baffles comprises 6 to 12 baffles.

7. The shell-and-tube heat exchanger according to claim 1, wherein the metal of each of the baffles is steel or stainless steel.

8. The shell-and-tube heat exchanger according to claim 1, wherein a width of the bridging structure between two adjacent annular structures is at least 2.0 mm.

9. The shell-and-tube heat exchanger according to claim 8, wherein the width of the bridging structure between the two adjacent annular structures is between 2.5 and 5.0 mm.

10. The shell-and-tube heat exchanger according to claim 1, wherein a height of each of the baffles is between 4.0 and 10.0 mm.

11. The shell-and-tube heat exchanger according to claim 10, wherein the height of each of the baffles is between 4.5 and 7.0 mm.

12. A method for heating a liquid composition comprising steps:
  providing the shell-and-tube heat exchanger according to claim 7;
  providing a liquid composition to the inlet for a liquid;
  providing a heating fluid comprising steam to the shell-side space by means of the heating fluid inlet;
  heating the plurality of straight tubes by means of the heating fluid;
  extracting a liquid composition at the outlet for a liquid;
  extracting the heating fluid at the heating fluid outlet.

13. A method for stripping a liquid composition comprising urea, carbamate, ammonia and water comprising steps of:
  providing the shell-and-tube heat exchanger according to claim 7;
  providing a liquid composition comprising urea and carbamate to the inlet for a liquid;
  providing steam, the steam being saturated steam at a temperature between 195 and 225° C., to the shell-side space by means of the heating fluid inlet;
  providing a stripping gas comprising carbon dioxide to the inlet for a gas;
  contacting the liquid composition and the stripping gas, in a tube-side space disposed within the plurality of straight tubes;
  heating the plurality of straight tubes by means of the steam;
  extracting a liquid composition comprising urea and water and a reduced amount of carbamate and ammonia at the outlet for a liquid;
  extracting a gas mixture comprising ammonia, carbon dioxide and water at the outlet for a liquid;
  extracting steam and steam condensate at the heating fluid outlet.

14. A method for producing a solid, particulate, urea-based composition comprising steps of:
  a) reacting a mixture of ammonia and carbon dioxide in a urea reactor, thereby producing an aqueous composition comprising urea, carbamate and ammonia;
  b) directing a liquid composition comprising urea, carbamate and ammonia obtained in step a) to the shell-and-tube heat exchanger according to claim 7;
  c) directing a stream of saturated steam at a temperature between 195 and 215° C. to the heating fluid inlet;
  d) directing a stripping gas comprising carbon dioxide to the inlet for a gas;
  e) extracting a liquid composition comprising urea and a reduced amount of ammonia and carbamate from the shell-and-tube heat exchanger;
  f) concentrating the liquid composition comprising urea and a reduced amount of ammonia and carbamate obtained in step e), thereby obtaining a concentrated urea aqueous solution;
  g) transforming the concentrated urea aqueous solution obtained in step f) into a solid, particulate, urea-based composition.

* * * * *